United States Patent [19]

Koike et al.

[11] 4,336,530
[45] Jun. 22, 1982

[54] THIN KEYBOARD WITH CHANGEABLE KEY INDICIA

[75] Inventors: Mamoru Koike, Nara; Shigeki Komaki, Yamatokoriyama; Tomohiro Inoue, Yoshino; Akira Tanimoto, Kashihara; Yoshisaburo Yoshida, Yaita, all of Japan

[73] Assignee: Sharp Kabushiki Kaisha, Osaka, Japan

[21] Appl. No.: 225,257

[22] Filed: Jan. 16, 1981

Related U.S. Application Data

[63] Continuation of Ser. No. 26,568, Apr. 3, 1979, abandoned.

[30] Foreign Application Priority Data

Apr. 6, 1978 [JP] Japan .............................. 53-45488[U]

[51] Int. Cl.³ .............................................. G06F 3/02
[52] U.S. Cl. ............................ 340/365 VL; 340/712; 400/493
[58] Field of Search ............ 340/365 R, 365 VL, 711, 340/712; 235/145 R, 146; 178/17 C; 179/90 K; 400/485, 477, 493, 493.1, 493.2; 40/486–491; 364/700, 709, 705

[56] References Cited

U.S. PATENT DOCUMENTS 3,200,375 8/1965 Lutz .............................. 340/365 VL
4,078,257 3/1978 Bagley .......................... 340/365 VL

OTHER PUBLICATIONS

IBM Technical Disclosure Bulletin, Johnson, vol. 13, No. 7, Dec. 1970, pp. 2041–2042.
IBM Technical Disclosure Bulletin, Weber, vol. 6, No. 1, Jun. 1963, p. 39.
IBM Technical Disclosure Bulletin, Cooper et al., vol. 11, No. 5, Oct. 1968, p. 524.

*Primary Examiner*—James J. Groody
*Attorney, Agent, or Firm*—Birch, Stewart, Kolasch & Birch

[57] ABSTRACT

A substantially thin keyboard for use in credit card sized clock calculators or the like includes a rigid plate carrying a plurality of stationary key contacts, a flexible member integral with a plurality of electrically conductive rubber movable contacts and a keyboard surface member, all of which are stacked in the named order. An indicia sheet is interposed between the flexible member and the keyboard surface member, which carries a plurality of groups of key indicia or markings. A slide switch is movably attached so as to shift the key indicia carried on the sheet in relation to the plurality of the stationary key contacts group by group. Masking members are secured on part of the keyboard surface member to conceal all the groups of the key indicia from view other than one group of the key indicia is presented in register with the stationary key contacts.

7 Claims, 11 Drawing Figures

THIN KEYBOARD WITH CHANGEABLE KEY INDICIA

This application is a continuation of copending application Ser. No. 26,568, filed on Apr. 3, 1979, now abandoned.

BACKGROUND OF THE INVENTION

This invention relates to an improvement in a substantially thin keyboard for use in a variety of small sized electrical apparatus.

A conventional low profile keyboard is designed to short or bridge a pair of stationary key contacts upon actuation of their corresponding electrically conductive rubber movable contact from above. The unique indicia printed on a key actuator cannot be changed unless the indicia is reprinted. In order to afford a plurality of functions to one of keys on the keyboard, a particular key is provided for distinction purposes. As an alternative, the key actuators are eliminated and an indicia carrying sheet is disposed immediately above all of electrically conductive rubber contacts. In this case, one or more distinction keys are further needed for multi-function keys as described previously.

For large size keyboards for use in computer terminals, etc., rather than the above discussed small sized or low profile keyboard for credit card size calculators and so forth, there have been suggested various approaches to change the indicium or marking, i.e., the function of the same key by the use of mechanical or electrical means. Such approaches require the keys of the device large in size and complicated in construction and the indicia or markings on the respective keys are difficult to read.

SUMMARY OF THE INVENTION

It is therefore an object of the present invention to provide an improved thin keyboard with facilities for changing key identifying markings or indicia of respective keys on the keyboard. An important feature of the present invention is a sheet member carrying key indicia printed thereon slidably disposed immediately above all of pairs of electrically conductive rubber contacts. A transparent sheet or the like is disposed above the indicia sheet member.

According to one preferred form of the present invention, there is provided a substantially thin keyboard which includes a rigid plate carrying a plurality of stationary key contacts, a flexible member integral with a plurality of electrically conductive rubber movable contacts and a keyboard surface member. An indicia sheet is interposed between the flexible member and the keyboard surface member, which carries a plurality of groups of key indicia or markings. A proper means, for example, a slide switch is provided for shifting the key indicia carried on the sheet in relation to the plurality of the stationary key contacts group by group. Masking members are secured on part of the keyboard surface member to conceal all the groups of the key indicia from view except one group of the key indicia in register with the stationary key contacts.

BRIEF DESCRIPTION OF THE DRAWINGS

For a more complete understanding of the present invention and for further objects and advantages thereof, reference is now made to the following description taken in conjunction with the accompanying drawings, in which.

DETAILED DESCRIPTION OF THE INVENTION

Figure 1:
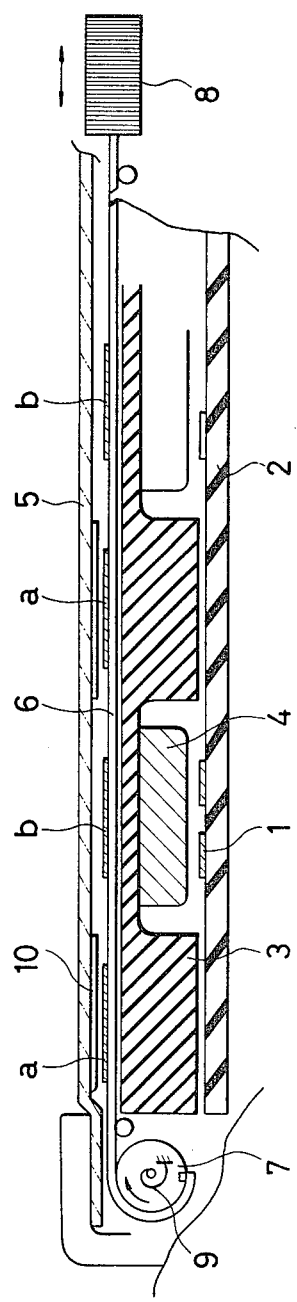
FIG. 1 is a cross sectional view of a keyboard according to a first embodiment of the present invention.

Referring now to FIG. 1, there is illustrated a first embodiment of the present invention, which comprises a plurality of pairs of stationary key contacts 1, a rigid board 2 carrying the plurality of pairs of the key contacts 1 thereon, an elastic member 3 of, for example, rubber material, and a plurality of electrically conductive rubber contacts 4 adapted to short or bridge the stationary key contacts upon actuation from above. A highly flexible, transparent sheet 5 is printed in a particular opaque color, for example, black and serves as masks for part of an indicia sheet to be described below.

Between the transparent sheet 5 and the elastic member 3 there is interposed the indicia sheet 6 carrying a plurality of groups (e.g., two groups) of key indicia or markings, with one end thereof fixed to a rotor 7 and the other end connected to a slide switch 8. The two groups of the key indicia are intended for the timepiece and calculator functions, for example: the first group for the former is denoted by FIG. 2(a) and the second group for the latter by FIG. 2(b).

The rotor 7 is loaded with the force of a spring 9 for facilitating movement of the key indicia sheet 6. Since the first group a of the key indicia is concealed from the operator's view by the mask member 10 in the operational condition denoted by FIG. 2(a), the operator is able to see only the second group b. On the other hand, when the slide switch 8 is moved to the right side with the accompanying right-oriented movement of the key indicia sheet, only the key indicia belonging to the group a are viewable from the operator and that in the other group b are located and concealed beneath the mask member. Therefore, if the group a of the key indicia is necessary for the timepiece function and the other group 6 for the calculator function, then the slide switch is selectively moved to the right side or the left side to place the electronic apparatus to the timepiece mode or the calculator mode.

It will be noted that the key indicia sheet 6 may be either a mylar sheet, a stainless sheet or a silk screen to keep the whole of the keyboard substantially thin.

Figure 2B:
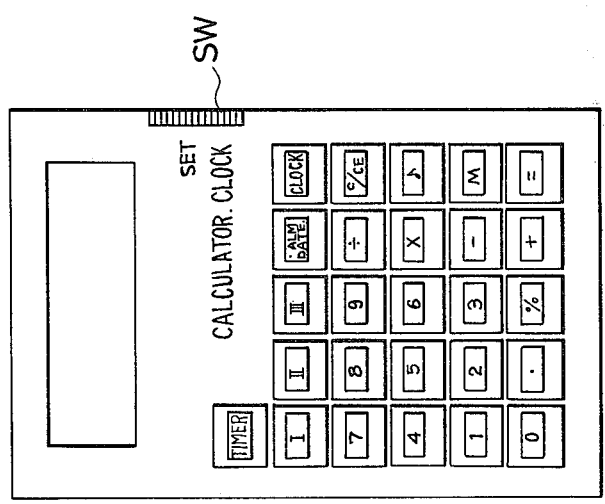
FIGS. 2(a) and 2(b) are plan views of an electronic apparatus using the keyboard of FIG. 1.
Figure 2A:
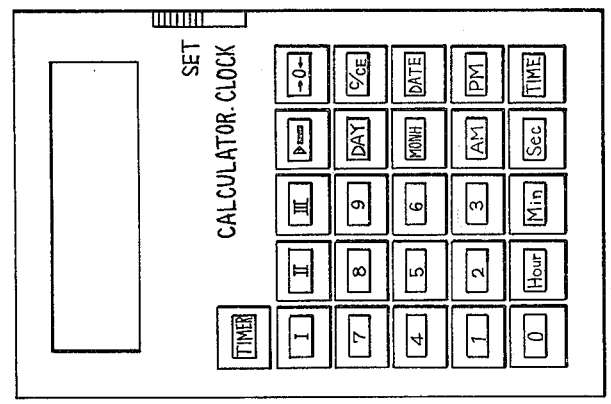

FIGS. 2(a) and 2(b) are plan views of an electronic apparatus using the above described keyboard, wherein the first group a of the key indicia is exposed to the operator's view in the state as indicated in FIG. 2(a) and the second group b is exposed but the first group a is masked in the state as in FIG. 2(b).

Figure 3:
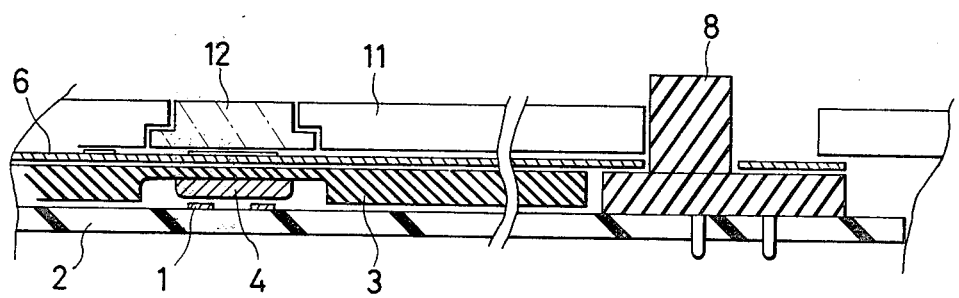
FIG. 3 is a cross sectional view of a second embodiment of the present invention.

In FIG. 3, there is illustrated a second embodiment in which the stationary key contacts 1, the rigid board 2, the elastic member 3 and the electrically conductive rubber movable contacts 4 are the same as in the first and previous embodiment. There is an exception only in that a housing 11 and a plurality of transparent key actuators 12 are provided instead of the transparent sheet 5. Advantageously, this embodiment is hardly damaged or shrunk, though the thickness of the keyboard is somewhat greater.

Figure 4:
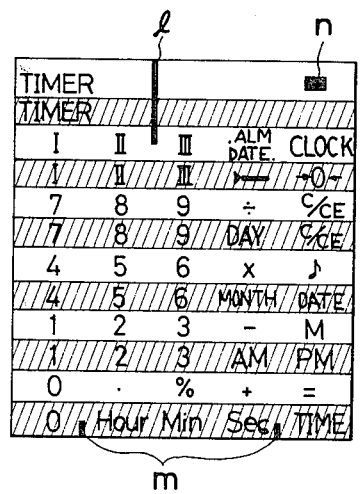
FIG. 4 is a plan view of an indicia carrying sheet.

It is obvious to those skilled in the art that the key indicia sheet may be either connected directly to the rotor as described above or limited to only a necessary length as illustrated in FIG. 4. In the latter, several projections (not shown) formed on the indicia sheet are fitted in cutouts l and m to prevent the indicia sheet from being shifted to the left or right side. Another cutout n is brought into agreement with the position of the slide switch 8. A spacer member may be interposed between the elastic member and the housing to render movement of the indicia sheet smooth.

Figure 5A:
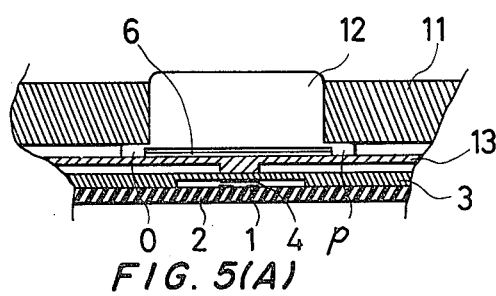
FIGS. 5(a) through 5(c) are representations of a third embodiment of the present invention.

A third embodiment illustrated in FIG. 5(a) is adapted to stabilize movement of the indicia sheet and make actuation of keys easy. It is possible in the previous two embodiments that the spacing between the housing and the elastic member will become uneven, the indicia on the indicia sheet will be rubbed out while contacting other members, thereby interrupting movement of the indicia sheet. To this end the third embodiment comprises a platelike member 13 having elasticity disposed above the elastic member and the indicia sheet is interposed between the platelike member 13 and a key actuator 12 having a concave shape at the lower portion thereof, keeping the sliding movement of the indicia sheet smooth.

Figure 5B:
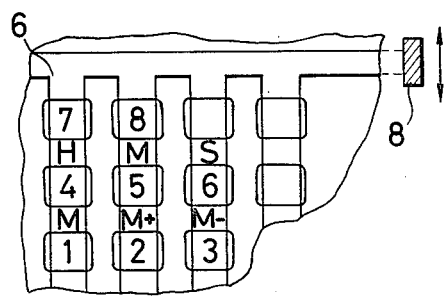

FIG. 5(b) is a schematic plan view of the embodiment of FIG. 5(a), indicating that the indicia sheet 6 is shiftable in union with the slide switch 8. In the illustrative example, numerical indicia are concealed and functional indicia are exposed to the surrounding atmosphere.

Figure 5C:
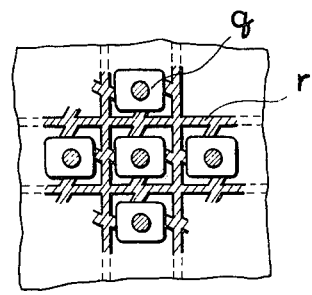

However, extensions o and p shown in FIG. 5(a) may turn the adjacent keys on via the elastic member 13. Such likelihood can be avoided as long as the elastic member 13 is of the shape shown in FIG. 5(c) which is a cross sectional view from above. In FIG. 5(c), the extensions are labeled q and the elastic member are labeled r.

Figure 6:
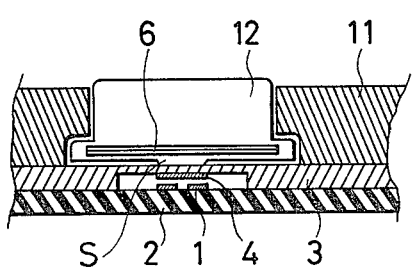
FIG. 6 is a cross sectional view of a fourth embodiment of the present invention.

FIG. 6 is a modification to the keyboard structure shown in FIGS. 5(a) through 5(c) with a reduced number of expenditures. An opening is formed in the lower portion of the key actuator 12 for receiving the indicia sheet 6 and the bottom of the key actuator 12 itself is of a convex shape. The electrically conductive movable contacts 3 are pressed directly by a protrusion S with the elastic member 13 eliminated. In the case where a key surface member is implemented with the key actuators, the mask members are provided inside of the housing 11.

Figure 7:
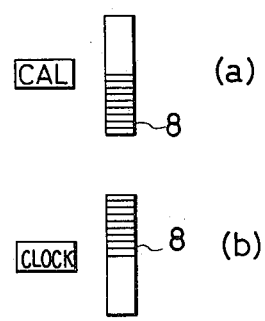
FIGS. 7(a) and 7(b) are schematic representations of the mode selection state.

A mode display may be altered concurrently with the changing of the key indicia as practiced in the various embodiments described above. FIG. 7(a) indicates that the apparatus is in the calculator mode and FIG. 7(b) indicates that the same is in the timepiece mode.

As stated above, the present invention provides an easily manipulable keyboard while keeping low profile properties since all the components of the keyboard are sheetlike. Cost reduction is possible in the manufacture of the key indicia sheet since all of the key indicia can be printed at the same time. As far as the keyboard surface member comprises a transparent sheet, openings or recessions are eliminated from the surface of the keyboard. Thus, the present invention provides highly reliable keyboard which is free of various causes of contact failures such as dust and moisture.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A substantially thin keyboard for use in a multi-function calculator, said keyboard comprising:
   a frame;
   a plurality of keys having at least first and second functions, said plurality of keys being spaced apart at a predetermined distance in a first direction and including,
   a plurality of stationary key contacts positioned on said frame;
   a plurality of electrically conductive movable contacts operatively associated with said stationary key contacts, each of said plurality of electrically conductive contacts being movable to bridge an associated one of said stationary key contacts;
   an indicia sheet of relatively thin material having indicia imprinted thereon, each of said first and second functions of each key having an indicia associated therewith, said indicia being separated by less than said predetermined distance is said first direction;
   a function selection switch for selecting the function of said plurality of keys, said function switch having at least a first position for selection of the first function and a second position for selection of the second function;
   said function selection switch being operatively connected to said indicia sheet to shift said indicia sheet less than said predetermined distance in said first direction to place the indicia associated with the function selected into view; and
   mask means for concealing from view indicia not associated with the function selected.

2. A substantially thin keyboard for use in a multi-function calculator, said keyboard comprising:
   a frame;
   a plurality of keys having at least first and second functions, said plurality of keys being spaced apart at a predetermined distance in a first direction;
   an indicia sheet of relatively thin material having indicia imprinted thereon, each of said first and second functions of each key having an indicia associated therewith, said indicia being separated by less than said predetermined distance in said first direction;
   a function selection switch for selecting the function of said plurality of keys, said function switch having at least a first position for selection of the first function and a second position for selection of the second function;
   said function selection switch being operatively connected to said indicia sheet to shift said indicia sheet less than said predetermined distance in said first direction to place the indicia associated with the function selected into view; and
   mask means for concealing from view indicia not associated with the function selected.

3. A substantially thin keyboard for use in a multi-function calculator, said keyboard comprising:

a frame;

a plurality of keys arranged in an array having a predetermined width in a first direction, each of said keys having at least first and second functions, said plurality of keys including, a plurality of stationary key contacts positioned on said frame;

a plurality of electrically conductive movable contacts operatively associated with said stationary key contacts, each of said plurality of electrically conductive contacts being movable to bridge an associated one of said stationary key contacts;

an indicia sheet of relatively thin material having indicia imprinted thereon, each of said first and second functions of each key having an indicia associated therewith;

a function selected switch for selecting the function of said plurality of keys, said function switch having at least a first position for selection of the first function and a second position for selection of the second function;

said function selection switch being operatively connected to said indicia sheet to shift said indicia sheet a distance less than the predetermined width of said array in said first direction to place the indicia associated with the function selected into view; and mask means for concealing from view indicia not associated with the function selected.

4. A substantially thin keyboard for use in a multi-function calculator, said keyboard comprising:

a frame;

a plurality of keys arranged in an array having a predetermined width in a first direction, each of said keys having at least first and second functions;

an indicia sheet of relatively thin material having indicia imprinted thereon, each of said first and second functions of each switch having an indicia associated therewith;

a function selection switch for selecting the function of said plurality of keys, said function switch having at least a first position for selection of the first function and a second position for selection of the second function;

said function selection switch being operatively connected to said indicia sheet to shift said indicia sheet a distance less than the predetermined width of said array in said first direction to place the indicia associated with the function selected into view; and mask means for concealing from view indicia not associated with the function selected.

5. The keyboard of claim 1, 2, 3 or 4 wherein said mask means is a highly flexible transparent sheet imprinted in an opaque color in areas where a view of the indicia is undesired.

6. The keyboard of claim 1, 2, 3 or 4 wherein said function selection switch is a slide switch.

7. The keyboard of claim 5 wherein said mask means is positioned over substantially the entire surface of said keyboard.

* * * * *